(12) United States Patent
Ito et al.

(10) Patent No.: US 7,104,150 B2
(45) Date of Patent: Sep. 12, 2006

(54) SHIFT POSITION DETECTION APPARATUS FOR VARIABLE SPEED GEAR

(75) Inventors: Katsuhiko Ito, Saitama (JP); Shinichiro Keyaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 91 days.

(21) Appl. No.: 10/829,948

(22) Filed: Apr. 23, 2004

(65) Prior Publication Data

US 2004/0211276 A1  Oct. 28, 2004

(30) Foreign Application Priority Data

Apr. 24, 2003 (JP) ............................. 2003-120449

(51) Int. Cl.
*F16H 59/00* (2006.01)
*F16H 61/00* (2006.01)
*F16H 63/00* (2006.01)

(52) U.S. Cl. ................. 74/335; 74/336 R; 74/473.3; 74/473.37; 192/30 W; 340/456

(58) Field of Classification Search ............ 74/335, 74/336 R, 473.37, 473.18, 473.3, 473.1; 477/79, 111; 476/4, 40; 192/30 W; 116/28.1; 340/425.5, 450.1, 451, 456
See application file for complete search history.

(56) References Cited

U.S. PATENT DOCUMENTS 4,676,115 A * 6/1987 Morscheck et al. ........... 74/339
4,821,607 A * 4/1989 Kawai ....................... 477/123
5,304,981 A * 4/1994 Leising et al. .............. 340/456
5,487,318 A * 1/1996 Schott ....................... 74/606 R
6,001,041 A * 12/1999 Sawase et al. .............. 475/198
6,324,928 B1 * 12/2001 Hughes ....................... 74/335
6,481,304 B1 * 11/2002 Yoshioka et al. ............. 74/335
6,736,024 B1 * 5/2004 Spence et al. ............. 74/473.1

FOREIGN PATENT DOCUMENTS

JP       62251240 A  * 11/1987
JP       3325843 B2    7/2002

* cited by examiner

*Primary Examiner*—Charles A. Marmor
*Assistant Examiner*—David D. Le
(74) *Attorney, Agent, or Firm*—Birch, Stewart, Kolasch & Birch, LLP

(57) ABSTRACT

A shift position detection apparatus for a variable speed gear wherein a shift shaft is moved in an axial direction to perform a speed changing operation. A variable speed gear includes a clutch sleeve disposed for movement in an axial direction on a counter shaft with a shift shaft disposed so as to extend in parallel to the counter shaft. A shift fork is coupled and attached to the shift shaft and has an end engaged with the clutch sleeve. The clutch sleeve is moved in the axial direction through the shift fork to select a shift position. A shift position detection apparatus includes F, R and N shift detection portions provided on the shift fork. The F shift detection portion and the R shift detection portion are spaced by approximately 60 degrees in a circumferential direction on substantially the same plane perpendicular to the axis of a cylindrical portion.

18 Claims, 10 Drawing Sheets

SHIFT POSITION DETECTION APPARATUS FOR VARIABLE SPEED GEAR

CROSS-REFERENCE TO RELATED APPLICATIONS

The present application claims priority under 35 USC 119 to Japanese Patent Application No. 2003-120449 filed on Apr. 24, 2003 the entire contents thereof is hereby incorporated by reference.

BACKGROUND OF THE INVENTION

1. Field of the Invention

This invention relates to a variable speed gear wherein a shift shaft and a shift fork are moved in an axial direction in response to a shift movement of a shift operation member to move a clutch member on a power transmission shaft and to select a shift position.

2. Description of Background Art

Various types of variable speed gears for use with a gear type variable speed mechanism which includes a plurality of gear trains are conventionally known for selecting one of the gear trains. As a speed change mechanism for use with a gear variable speed gear of the type described, for example, a speed change mechanism of the selective sliding type is provided wherein a power transmission gear is moved on a power transmission shaft to select meshing of the gear. In addition, another speed change mechanism of the normally meshing type is provided wherein a power transmission gear is normally held in a meshing state and control for engagement and disengagement of the power transmission gear is performed. A power transmission shaft is provided on which the power transmission gear is supported for rotation. The above device is well known and conventionally. It is to be noted that also it is well known to use a synchromesh mechanism (synchronous mesh mechanism) for the normally meshing type speed change mechanism.

A transmission which uses such a variable speed gear as described above is popularly adopted as transmissions for two-wheeled vehicles, four-wheeled vehicles and so forth. A variable speed gear disclosed in Japanese Patent No. 3325843 is consider as an example of a transmission of this type. This variable speed gear includes a clutch member disposed for movement in an axial direction on a power transmission shaft with a shift fork having an end held in engagement with the clutch member. A shift drum is provided on which the shift fork is attached with a cam mechanism provided between the shift drum and the shift fork. The shift drum is rotated in response to a shift operation to move the shift fork in the axial direction through the cam mechanism to move the clutch member in the axial direction on the power transmission shaft thereby to select a shift position.

A variable speed gear is usually configured such that, when a selection of a shift position (that is, a speed changing operation) is performed, the shift position is detected and control corresponding to the shift position is performed. Therefore, the apparatus disclosed in Japanese Patent No. 3325843 mentioned hereinabove detects a rotational angular position of the shift drum to detect the shift position.

In addition, not only is a variable speed gear of the type which uses a shift drum as described above available but also another variable speed gear is available which is configured such that a shift fork is coupled and attached to a shift shaft disposed to extend in parallel to a power transmission shaft such that the shift shaft and the shift fork are moved in an axial direction in response to a shift operation to move a clutch member in the axial direction on the power transmission shaft to select a shift position. In a variable speed gear wherein a shift shaft is moved in an axial direction to perform a speed changing operation in this manner, such a shift position detection apparatus as described in Japanese Patent No. 3325843 mentioned hereinabove cannot be used. A plurality of position sensors for detecting the position of the shift shaft in the axial direction corresponding to the individual shift positions are required. Therefore, the variable speed gear encounters a problem wherein the configuration of the shift position detection apparatus is liable to have an increase in scale and be complicated.

SUMMARY AND OBJECTS OF THE INVENTION

The present invention has been made in view of the problem as just described. It is an object of the present invention to miniaturize and make compact a shift position detection apparatus for a variable speed gear wherein a shift shaft is moved in an axial direction to perform a speed changing operation.

In order to attain such an object as described above, according to the present invention, a variable speed gear includes a clutch member or clutch sleeve 16 in an embodiment of the invention that is disposed for movement in an axial direction on a power transmission shaft or counter shaft 15. A shift shaft is disposed so as to extend in parallel to the power transmission shaft with a shift fork coupled and attached to the shift shaft and having an end engaged with the clutch member. In response to a shift operation, the shift shaft and the shift fork are moved in the axial direction to move the clutch member in the axial direction on the power transmission shaft to select a shift position. Further, a shift position detection apparatus is provided for the variable speed gear that includes a plurality of shift detection portions, for example, an F shift detection portion 76a, an R shift detection portion 76b and an N shift detection portion 72b, provided on the shift shaft or the shift fork in a corresponding relationship to a plurality of shift positions. A plurality of position sensors, for example, an F position sensor 81, an R position sensor 82 and an N position sensor 83, are individually disposed in an opposing relationship to the shift detection portions and are configured such that the movement of the shift detection portions in the axial direction by the movement of the shift shaft in the axial direction is detected by the position sensors to detect the shift position. Further, at least two, for example, the F shift detection portion 76a and the R shift detection portion 76b, of the plural shift detection portions are disposed at different positions on a substantially same plane perpendicular to the axis of the shift shaft.

With the shift position detection apparatus according to the present invention having such a configuration as described above, at least two of the shift detection portions are disposed at different positions on the substantially same plane perpendicular to the axis of the shift shaft, that is, at the same position in the axial direction. Therefore, at least two shift detection portions and the position sensors opposing to them are disposed at positions on the substantially same plane perpendicular to the axis, that is, at the same position in the axial direction. Consequently, the dimension of the variable speed gear in the axial direction is not increased and can be miniaturized and made compact.

It is to be noted that the shift position detection apparatus may be configured such that the shift fork includes a cylindrical portion fitted on and attached to the shift shaft and a fork portion extending in a projecting manner in a diametrically outer direction from an outer circumferential surface of the cylindrical portion and engaged with the clutch member. In addition, at least two shift detection portions are formed from concave portions or convex portions formed at different positions of the outer circumferential surface of the cylindrical portion on the substantially same plane perpendicular to the axis of the shift shaft. At least two shift detection portions may be formed from concave portions or convex portions formed at different positions of an outer circumferential surface of the shift shaft on the substantially same plane perpendicular to the axis of the shift shaft.

When such a configuration as described above is employed, the length of the shift shaft can be suppressed thereby miniaturizing and making a compact variable speed gear. Particularly where at least two shift detection portions are provided on the outer periphery of the cylindrical portion of the shift fork, the number of shift detection portions to be provided on the shift shaft can be reduced to reduce the length of the shift shaft. Consequently, the variable speed gear can be further miniaturized and made compact.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
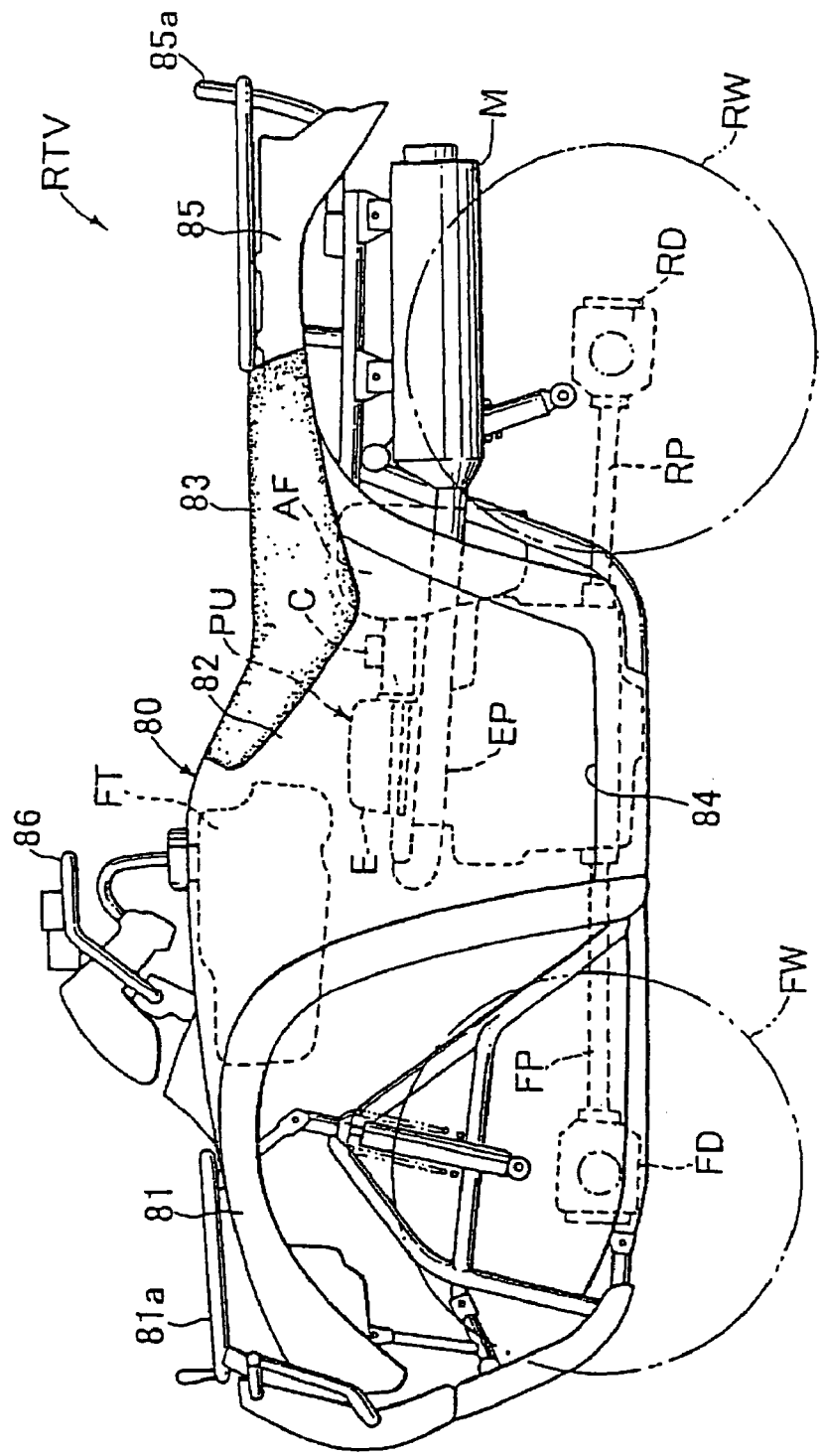
FIG. 2 is a side elevational view of a vehicle for traveling on an irregular ground which includes the hydraulic continuously variable transmission.
Figure 3:
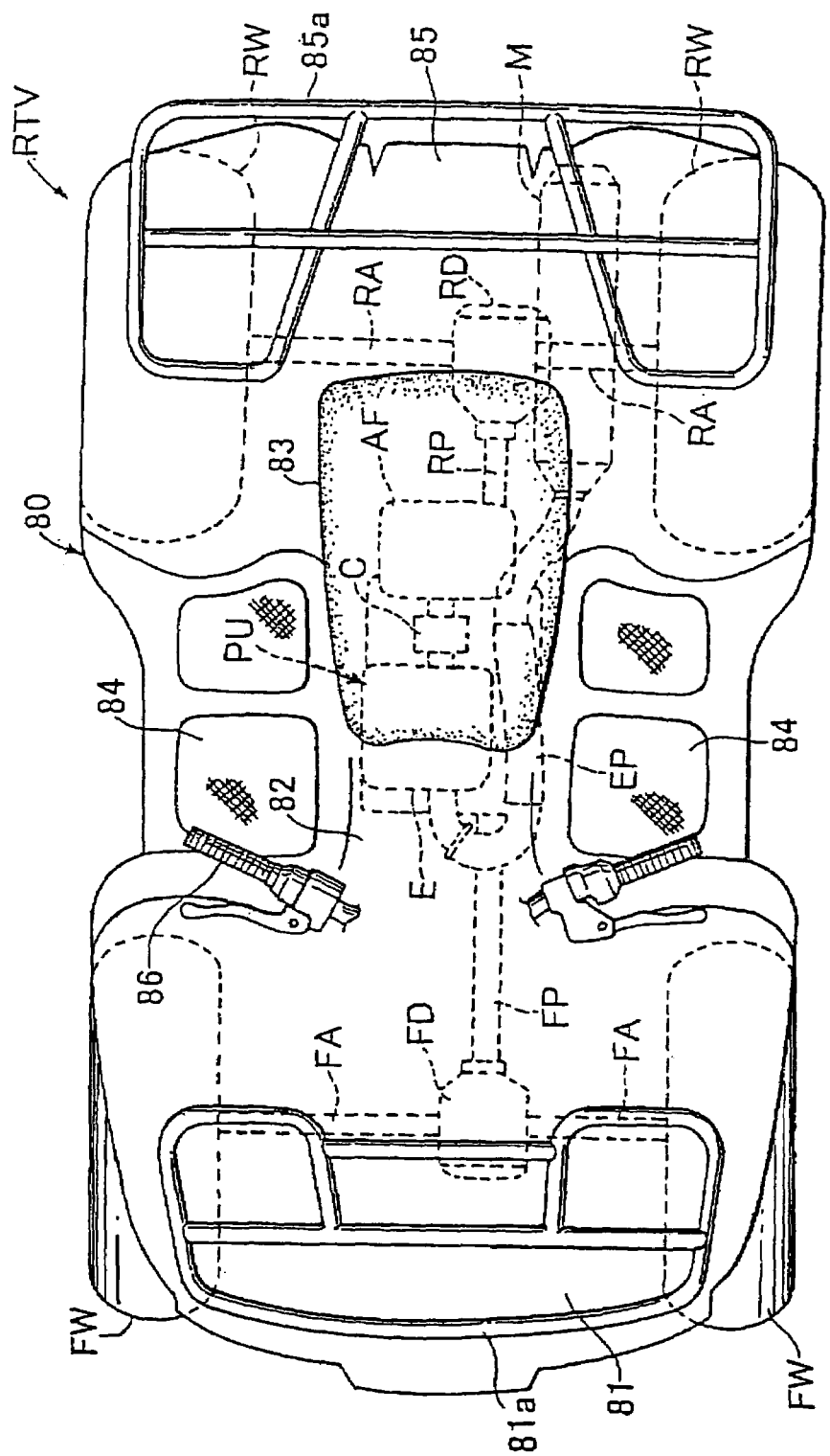
FIG. 3 is a plan view of the vehicle for traveling on an irregular ground which includes the hydraulic continuously variable transmission.
Figure 4:
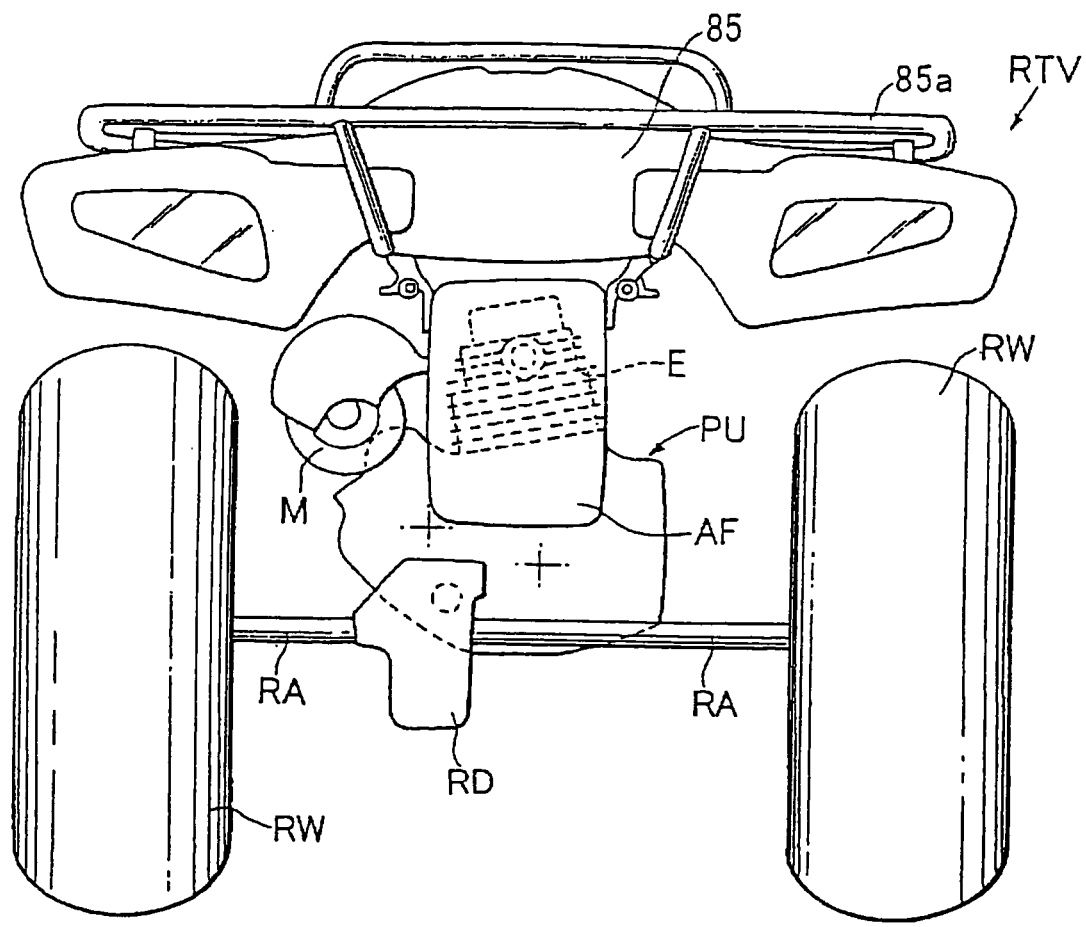
FIG. 4 is a rear elevational view of the vehicle for traveling on an irregular ground which includes the hydraulic continuously variable transmission.

In the following, a preferred embodiment of the present invention is described with reference to the drawings. FIGS. 2 to 4 show a vehicle RTV for traveling on an irregular ground which includes a hydraulic continuously variable transmission having a variable speed gear according to the present invention. The vehicle RTV includes a power unit PU built in a vehicle body 80 having a frame structure in the inside thereof and left and right front and rear wheels FW and RW which receive and are driven by output power of the power unit PU. The vehicle body 80 includes a front fender section 81 having a front guard 81a positioned at a front portion of the vehicle body. A saddle section 82 is provided that is swollen upwardly at a mid portion of the vehicle body and extends forwardly and rearwardly. Left and right step sections 84, 84 are formed to extend leftward and rightward at left and right lower portions of the saddle section 82. A rear fender section 85 includes a rear guard 85a and is positioned at a rear portion of the vehicle body. A seat 83 on which a driver is to be seated is provided on the saddle section 82. The driver seated on the seat 83 across the saddle section 82 in this manner places the feet thereof on the left and right step sections 84 and operates to move a steering handle member 86 which is positioned forward and can be steered leftward and rightward. It is to be noted that a fuel tank FT is disposed in the front side of the saddle section 82 as seen in FIG. 2.

The power unit PU is disposed in the inside of the saddle section 82. The power unit PU includes an engine E, a main clutch CL, a hydraulic continuously variable transmission CVT and a transmission gear train GT as hereinafter described. The engine E takes in an air fuel mixture produced by mixing air taken in through an air filter AF and fuel of the fuel tank FT in a carburetor C and causes the air fuel mixture to burn in a cylinder to generate a rotational driving force. It is to be noted that exhaust gas exhausted as a result of the combustion in the engine E is discharged from an exhaust pipe EP through a muffler M.

The rotational driving force of the engine E is transmitted from a crankshaft at a changed speed through the main clutch CL, hydraulic continuously variable transmission CVT and transmission gear train GT and outputted to front and rear propeller shafts FP and RP. The front propeller shaft FP is connected to a front differential mechanism FD, and the rotational driving force outputted to the front propeller shaft FP is transmitted from the front differential mechanism FD to the left and right front wheels FW through left and right front axle shafts FA to drive the front wheels FW. The rear propeller shaft RP is connected to a rear differential mechanism RD, and the rotational driving force outputted to the rear propeller shaft RP is transmitted to left and right rear wheels RW through left and right rear axel shafts RA to drive the rear wheels RW.

Figure 5:
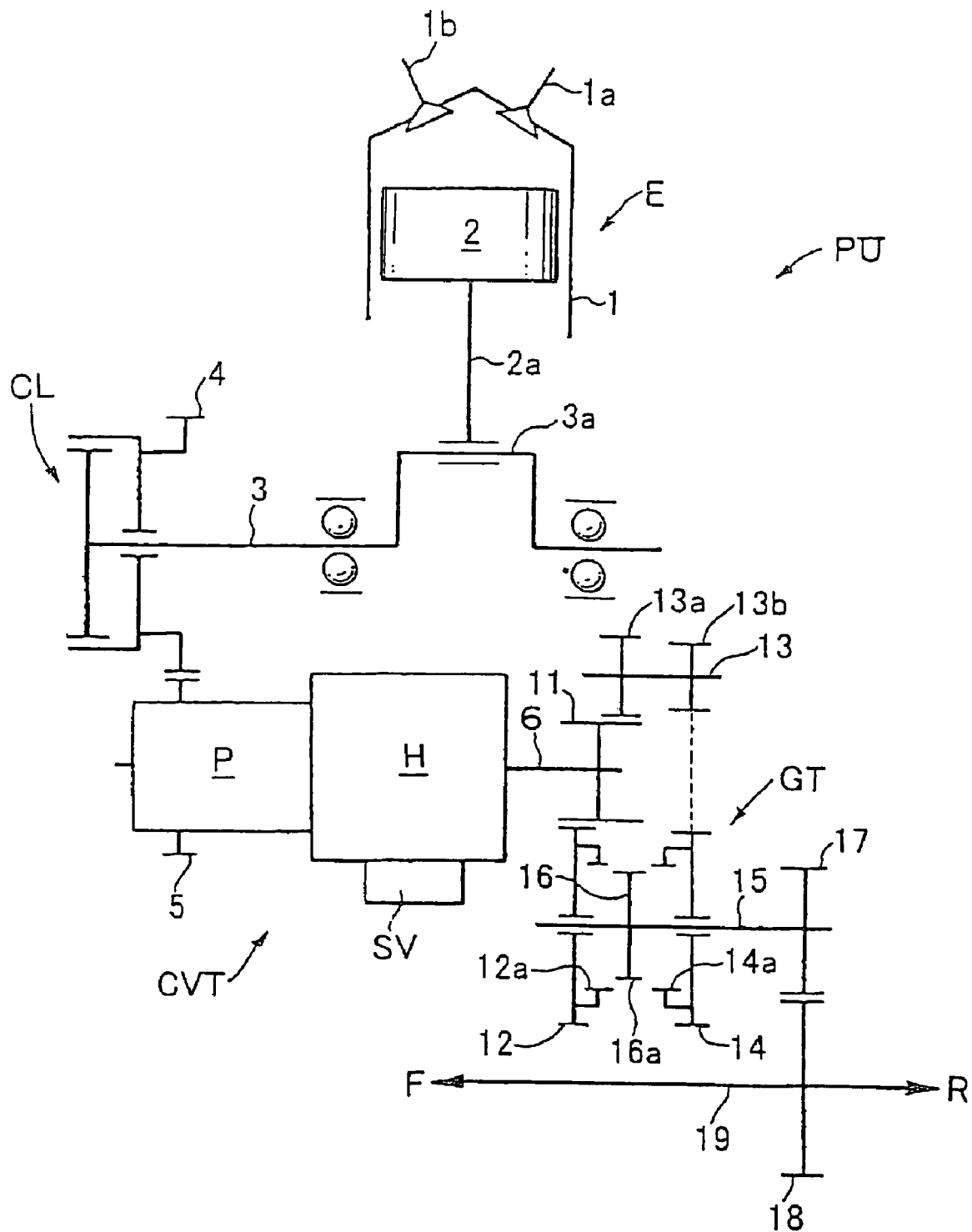
FIG. 5 is a schematic view showing a configuration of a power transmission route of a power unit formed using the hydraulic continuously variable transmission.
Figure 6:
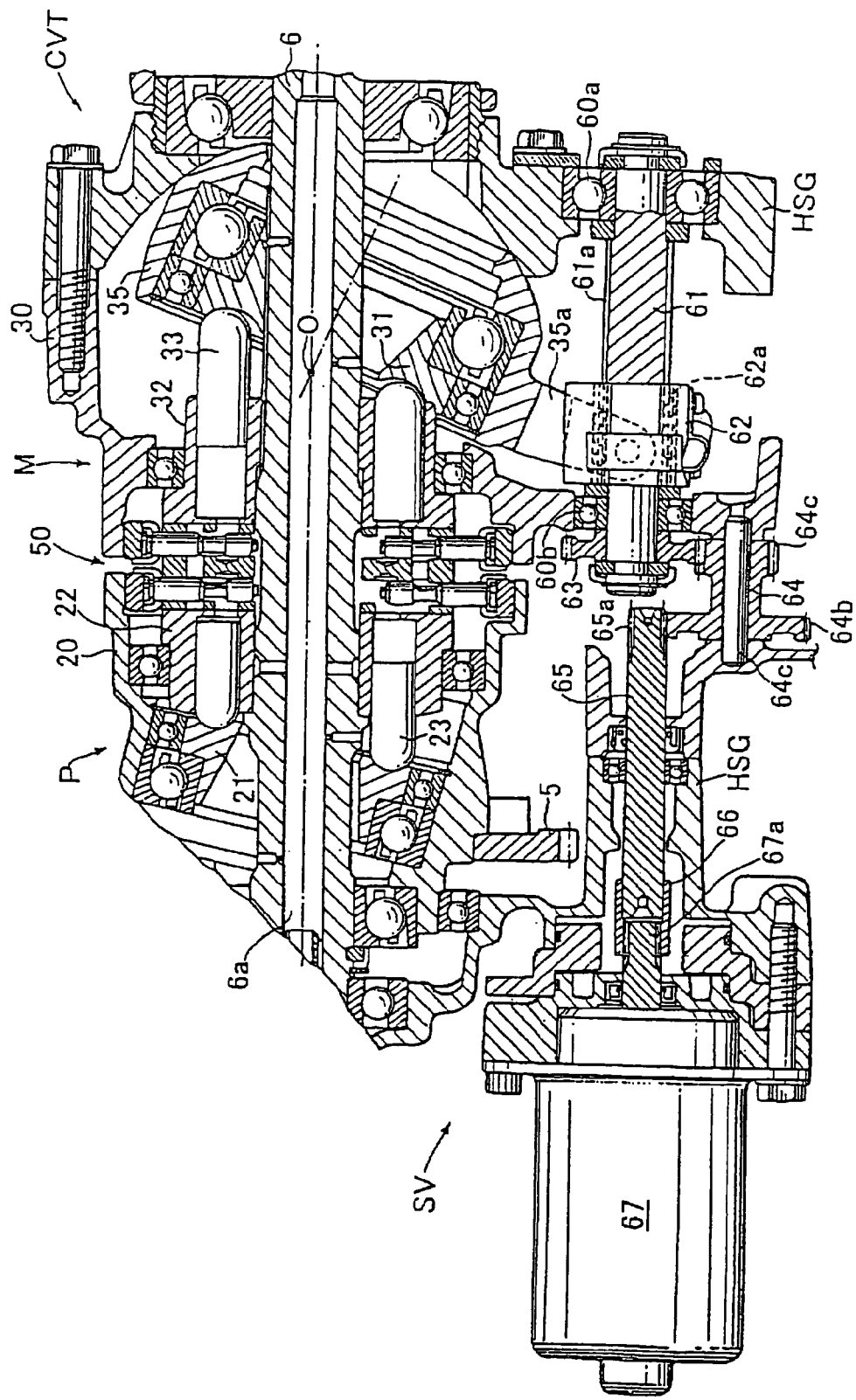
FIG. 6 is a sectional view of the hydraulic continuously variable transmission.

The power unit PU is described with reference to FIG. 5. The power unit PU includes an engine E for generating rotational driving power, a main clutch CL for controlling transmission of the rotational driving power, a hydraulic continuously variable transmission CVT for changing the speed of the rotational driving power transmitted thereto through the main clutch CL continuously and a transmission gear train GT for performing a changing over of the direction of and transmitting output rotation of the hydraulic continuously variable transmission CVT. It is to be noted that the power unit PU is disposed in the inside of the saddle section 82 such that an engine crankshaft extends forwardly and rearwardly of a vehicle body.

The engine E includes a piston 2 disposed in a cylinder 1 which has intake and exhaust valves 1a and 1b at a head portion thereof. In the engine E, air taken in through the air filter AF and fuel of the fuel tank FT are mixed to produce an air fuel mixture in the carburetor C as described hereinabove. The intake valve 1a is opened at a predetermined timing to take in the air fuel mixture into the cylinder chamber. Thereafter, the air fuel mixture is combusted in the cylinder chamber to move the piston 2 back and forth. The back and forth movement of the piston 2 is transmitted to a crank portion 3a through a connecting rod 2a to drive and rotate a crankshaft 3. The main clutch CL is provided at an end portion of the crankshaft 3 and control is performed for the engagement and disengagement between an input driving gear 4 disposed for rotation on the crankshaft 3 and the crankshaft 3. Therefore, the rotational driving power of the crankshaft 3 is transmitted to the input driving gear 4 in response to the engagement and disengagement control of the main clutch CL. It is to be noted that the main clutch CL is formed from a centrifugal clutch.

The hydraulic continuously variable transmission CVT includes a hydraulic pump P of the swash plate plunger type and a hydraulic motor H of the swash plate plunger type. An input driven gear 5 is coupled to a pump casing which forms the hydraulic pump P of the swash plate type and is held in meshing engagement with the input driving gear 4 and the rotational driving power of the engine E is transmitted to the input driven gear 5 to drive the pump casing to rotate. While details of the hydraulic continuously variable transmission CVT are hereinafter described, it is configured such that the output rotation whose speed has been continuously varied by the hydraulic continuously variable transmission CVT is outputted to a transmission output power shaft 6.

A transmission output power gear 11 forming the transmission gear train GT is coupled to the transmission output power shaft 6. Rotation of the transmission output power shaft 6 is transmitted from the transmission output power gear 11 through the transmission gear train GT.

Figure 9:
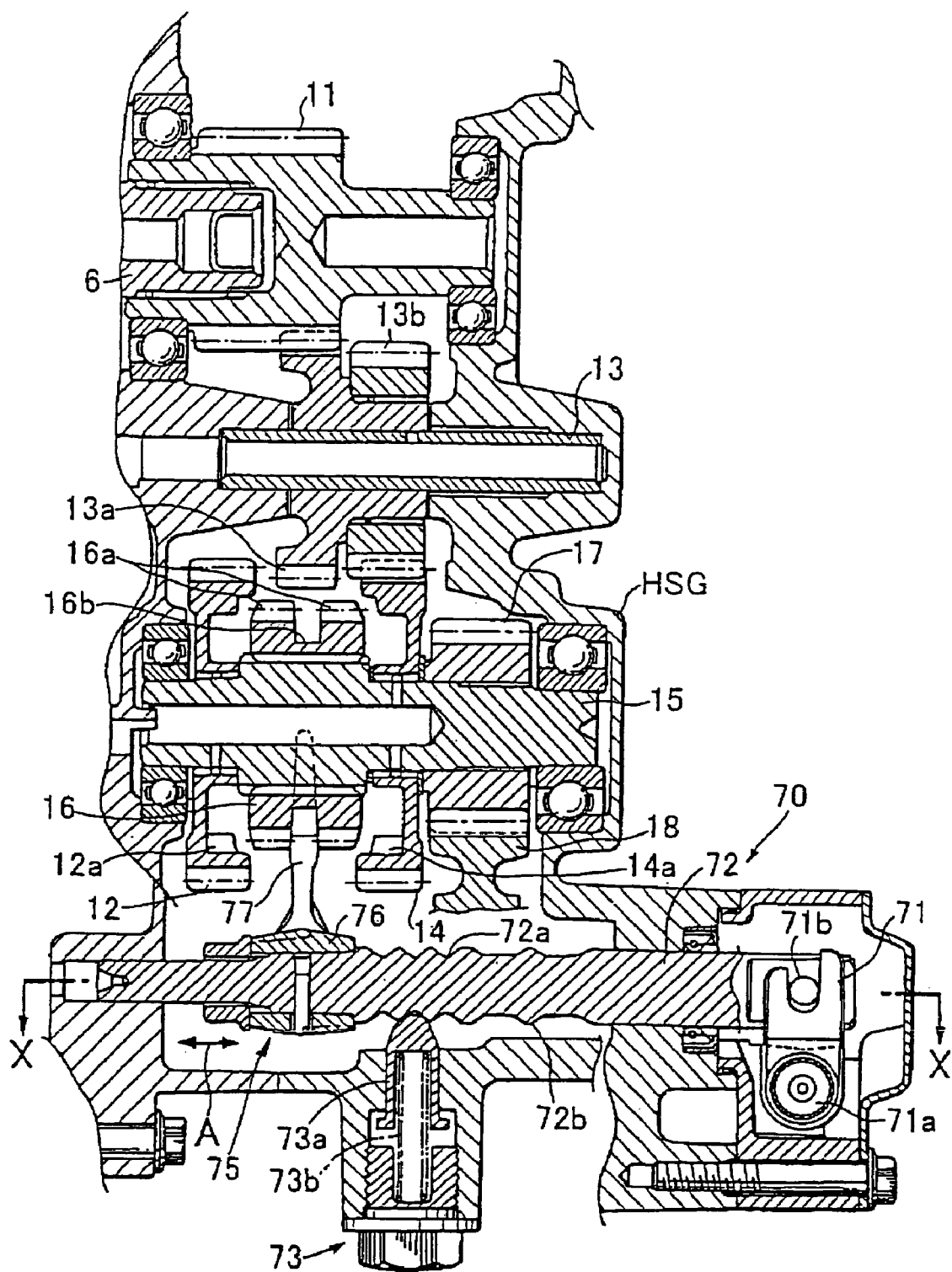
FIG. 9 is a sectional view showing a configuration of a transmission gear train and a shift mechanism of the hydraulic continuously variable transmission.

A configuration of the transmission gear train GT is particularly shown in FIG. 9, and the configuration is described with additional reference to FIG. 9. The transmission gear train GT includes a counter shaft 15 and an idler shaft 13 disposed in parallel to the transmission output power shaft 6. A forward gear 12 and a reverse gear 14 are disposed for rotation on the counter shaft 15, and an output driving gear 17 is coupled to and disposed on the counter shaft 15. Meanwhile, a first idler gear 13a and a second idler gear 13b are disposed for rotation on the idler shaft 13. The forward gear 12 is held in meshing engagement with the transmission output power gear 11 and also the first idler gear 13a is held in meshing engagement with the transmission output power gear 11. Meanwhile, the second idler bear 13b is held in meshing engagement with the reverse gear 14.

The forward gear 12 and the reverse gear 14 have internally toothed clutch gears 12a and 14a provided thereon with a clutch sleeve 16 being is provided between the forward gear 12 and the reverse gear 14. The clutch sleeve 16 is mounted for integral rotation with and for movement in an axial direction on the counter shaft 15. Externally toothed clutch gears 16a are formed on an outer periphery of the clutch sleeve 16, and the clutch sleeve 16 is moved in the axial direction to selectively mesh the externally toothed clutch gears 16a, 16a with the internally toothed clutch gears 12a and 14a thereby to form a dog tooth clutch. It is to be noted that the clutch sleeve 16 is moved in the axial direction in response to a shift lever operation to the forward side and the reverse side of the driver by a shift mechanism 70.

The shift mechanism 70 includes, as shown also in FIG. 9, a pivotal arm 71 is mounted for pivotal motion around a rotary shaft 71a supported on a transmission housing HSG. A shift shaft 72 is connected to an end of the pivotal arm 71 through a connecting pin 71b and movable in an axial direction, direction indicated by an arrow mark A in FIG. 9 with a shift fork 75 coupled and attached to the shift shaft 72. The shift fork 75 includes a cylindrical portion 76 fitted on and coupled to the shift shaft 72 and a fork portion 77 integrally connected to and projecting in a diametrical outer direction from the cylindrical portion 76 for engaging with a circumferential engaging groove 16b formed between the externally toothed clutch gears 16a of the clutch sleeve 16. It is to be noted that the rotary shaft 71a is rotated in response to a shift operation of a shift lever (not shown) provided on the steering handle member 86 to pivot the pivotal arm 71 around the rotary shaft 71a thereby to move the shift shaft 72 in the axial direction.

Three circumferential detent grooves 72a corresponding to a forward shift position F, a neutral position N and a reverse shift position R are formed on an outer periphery of the shift shaft 72. A spool 73a of a detent mechanism 73 is engaged with one of the detent grooves 72a under the biasing force of a spring 73b to position the shift shaft 72 at one of the three axially moved position positions.

Figure 10:
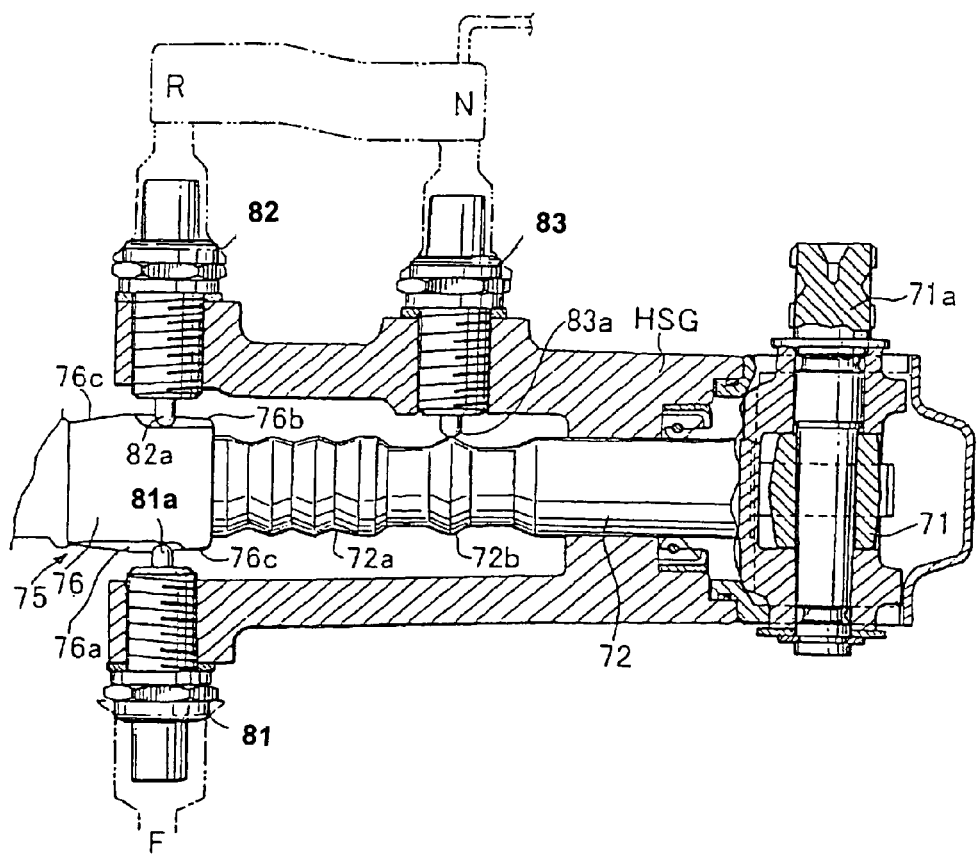
FIG. 10 is a partial sectional view taken along line X—X of FIG. 9 showing the shift mechanism.

An N shift detection portion 72b in the form of a circumferential projection is formed on the outer periphery of the shift shaft 72. The N shift detection portion 72b is provided to detect that the shift shaft 72 is positioned at the neutral position N. An N position sensor 83 is attached to and provided on the transmission housing HSG at a position at which it is opposed to the N shift detection portion 72b when the shift shaft 72 is positioned at the neutral position N. When the shift shaft 72 is positioned at the neutral position N, a sensor projection 83a of the N position sensor 83 is contacted with and pushed by the N shift detection portion 72b as seen in FIG. 10, the N position sensor 83 detects that the shift shaft 72 is positioned at the neutral position N.

An F shift detection portion 76a and an R shift detection portion 76b are formed as recesses or grooves positioned in a spaced relationship by a predetermined angle, for example, in the present example, approximately 60 degrees, in the circumferential direction on an outer periphery 76c of the cylindrical portion 76 of the shift fork 75. The F shift detection portion 76a and the R shift detection portion 76b are provided to detect that the shift shaft 72 is positioned at the forward position F and the reverse position R, respectively. An F position sensor 81 is attached to and provided on the transmission housing HSG at a position at which it is opposed to the F shift detection portion 76a when the shift shaft 72 is positioned at the neutral position N as seen in FIG. 10. Meanwhile, an R position sensor 82 is attached to and provided on the transmission housing HSG at another position at which it is opposed to the R shift detection portion 76b when the shift shaft 72 is positioned at the neutral position N as seen in FIG. 10. When the shift shaft 72 is positioned at the forward position F or the reverse position R, since the sensor projections 81a or 82a of the F position sensor 81 or the R position sensor 82 ride on or are pushed in by the outer periphery 76c of the cylindrical portion 76, the F and R position sensors 81 and 82 detect that the shift shaft 72 is positioned at the forward position or the reverse position, respectively.

In this manner, in the present embodiment, the F and R shift detection portions 76a and 76b are formed in a spaced relationship by the predetermined angle in the circumferential direction on the outer circumferential surface of the cylindrical portion 76, and the F and R position sensors 81 and 82 are provided in an opposing relationship to them, respectively. Consequently, since the F and R shift detection portions need not be provided on the outer circumferential surface of the shift shaft 72, the shift shaft 72 can be formed shorter as much. Further, the F and R shift detection portions 76a and 76b are formed in a spaced relationship by the predetermined angle on the outer circumferential surface of the cylindrical portion 76 and are positioned on the substantially same plane perpendicular to the axis, and the dimension of the cylindrical portion 76 in the axial direction required for the detection portions 76a and 76b is reduced as much. Further, the F and R position sensors 81 and 82 can be disposed at the positions on the substantially same plane perpendicular to the axis, and the dimension in the axial direction for disposition of the position sensors 81 and 82 can be reduced. Therefore, the dimension of the shift mechanism 70 in the axial direction can be reduced to miniaturize and make the shift mechanism 70 more compact.

It is to be noted that, while, in the present embodiment, the F and R shift detection portions 76a and 76b are formed in a spaced relationship by a predetermined angle on the outer circumferential surface 76c of the cylindrical portion 76, the predetermined angle can be set to an arbitrary angle unless the position sensors do not interfere with each other. Further, the F and R shift detection portions 76a and 76b can be formed on outer circumferential surfaces of the shift shaft 72 positioned on the substantially same plane perpendicular to the axis. Furthermore, an arbitrary two of the F, N and R detection sections 76a, 72b and 76b may be formed in a spaced relationship by a predetermined angle on the outer circumferential surface of the cylindrical portion 76 or the shift shaft 72, or all of the three detection portions may be formed in a spaced relationship by predetermined angles from each other on the outer circumferential surface.

When the driver performs a shift lever operation to the forward side, the operation is transmitted to the shift mechanism 70 to move the shift shaft 72 in the leftward direction in FIGS. 9 and 10, whereupon the clutch sleeve 16 is moved in the leftward direction in FIGS. 9 and 10 by the shift fork 75. Consequently, the externally toothed clutch gear 16a is brought into meshing engagement with the internally toothed clutch gear 12a thereby to couple the forward gear 12 to the counter shaft 15. Therefore, in this state, rotation of the transmission output power gear 11 is transmitted from the forward gear 12 to the counter shaft 15, and consequently, the output driving gear 17 is driven to rotate. It is to be noted that, at this time, the sensor projection 81a of the F position sensor 81 rides on and is pushed in by the outer periphery 76c of the cylindrical portion 76, and consequently, the F position sensor 81 detects that the shift shaft 72 is positioned at the forward position.

On the other hand, if the driver performs a shift lever operation to the reverse side, then the operation is transmitted by the shift mechanism 70 to move the shift shaft 72 in the rightward direction, and the clutch sleeve 16 is moved in the rightward direction in the FIGS. 9 and 10 by the shift fork 75. Consequently, the externally toothed clutch gear 16a is brought into meshing engagement with the internally toothed clutch gear 14a to couple the reverse gear 14 to the counter shaft 15. In this state, rotation of the transmission output power gear 11 is transmitted from the first idler gear 13a to the second idler gear 13b through the idler shaft 13 and then transmitted from the second idler gear 13b to the counter shaft 15 through the reverse gear 14 meshing with the second idler gear 13b thereby to drive the output driving gear 17 to rotate. The direction of rotation of the output driving gear 17 at this time is the opposite direction, reverse direction, to that where the shift lever operation is performed to the forward side. It is to be noted that, at this time, the sensor projection 82a of the R position sensor 82 rides on and is pushed in by the outer periphery 76c of the cylindrical portion 76, and the R position sensor 82 detects that the shift shaft 72 is positioned at the reverse position.

The output driving gear 17 is held in meshing engagement with an output driven gear 18 coupled and attached to a drive shaft 19 so that rotation of the output driving gear 17 is transmitted to the drive shaft 19 through the output driven gear 18. The front end of the drive shaft 19 is connected to the front propeller shaft FP while the rear end of the drive shaft 19 is connected to the rear propeller shaft RP. Consequently, the rotational driving force transmitted to the drive shaft 19 is transmitted to the front and rear propeller shafts FP and RP to drive the front and rear wheels FW and RW, respectively, as described hereinabove.

Now, the hydraulic continuously variable transmission CVT is described with reference to FIGS. 1 and 6 to 8. The hydraulic continuously variable transmission CVT includes a hydraulic pump P of the swash plate plunger type and a hydraulic motor H of the swash plate plunger type. The transmission output power shaft 6 is disposed such that it extends along the center of and through the hydraulic continuously variable transmission CVT. It is to be noted that the transmission output power shaft 6 is supported for rotation on the transmission housing HSG through ball bearings 7a and 7b.

The hydraulic pump P includes a pump casing 20 disposed coaxially for relative rotation on the transmission output power shaft 6, a pump swash plate member 21 disposed in an inclined relationship by a predetermined angle to the center axis of rotation of the pump casing 20 in the pump casing 20, and a pump cylinder 22 disposed in an opposing relationship to the pump swash plate member 21. The hydraulic pump P further includes a plurality of pump plungers 23 individually disposed for sliding movement in a plurality of pump plunger holes 22a which are formed in an annular arrangement around the center axis of the pump cylinder 22 and extend in the axial direction in the pump cylinder 22. The pump casing 20 is supported for rotation on the transmission output power shaft 6 through a bearing 8a and is supported for rotation on the transmission housing HSG through another bearing 8b. The pump swash plate member 21 is disposed for rotation around the axis inclined by the predetermined angle by bearings 21a and 21b on the pump casing 20. The pump cylinder 22 is supported for coaxial relative rotation on the pump casing 20 by a bearing 22c.

The input driven gear 5 is fastened and attached to the outer periphery of the pump casing 20 by a bolt 5a. An outer side end portion of each of the pump plungers 23 projects outwardly and is contacted and engaged with a swash plate surface 21c of the pump swash plate member 21. An inner side end portion of each pump plunger 23 is positioned in the pump plunger hole 22a in an opposing relationship to a valve body 51 of a distribution valve 50 hereinafter described to form a pump oil chamber 23a in the pump plunger hole 22a. It is to be noted that a pump opening 22b which acts as a pump discharge port and intake port is formed at an end portion of the pump plunger hole 22a. When the input driven gear 5 is driven to rotate as described hereinabove, the pump casing 20 is driven to rotate and the pump swash plate member 21 disposed in the inside of the pump casing 20 is rocked in response to the rotation of the pump casing 20. Consequently, the pump plungers 23 are moved back and forth in the pump plunger holes 22a in response to the rocking movement of the swash plate surface 21c to compress or decompress operating oil in the inside of the pump oil chambers 23a.

Figure 1:
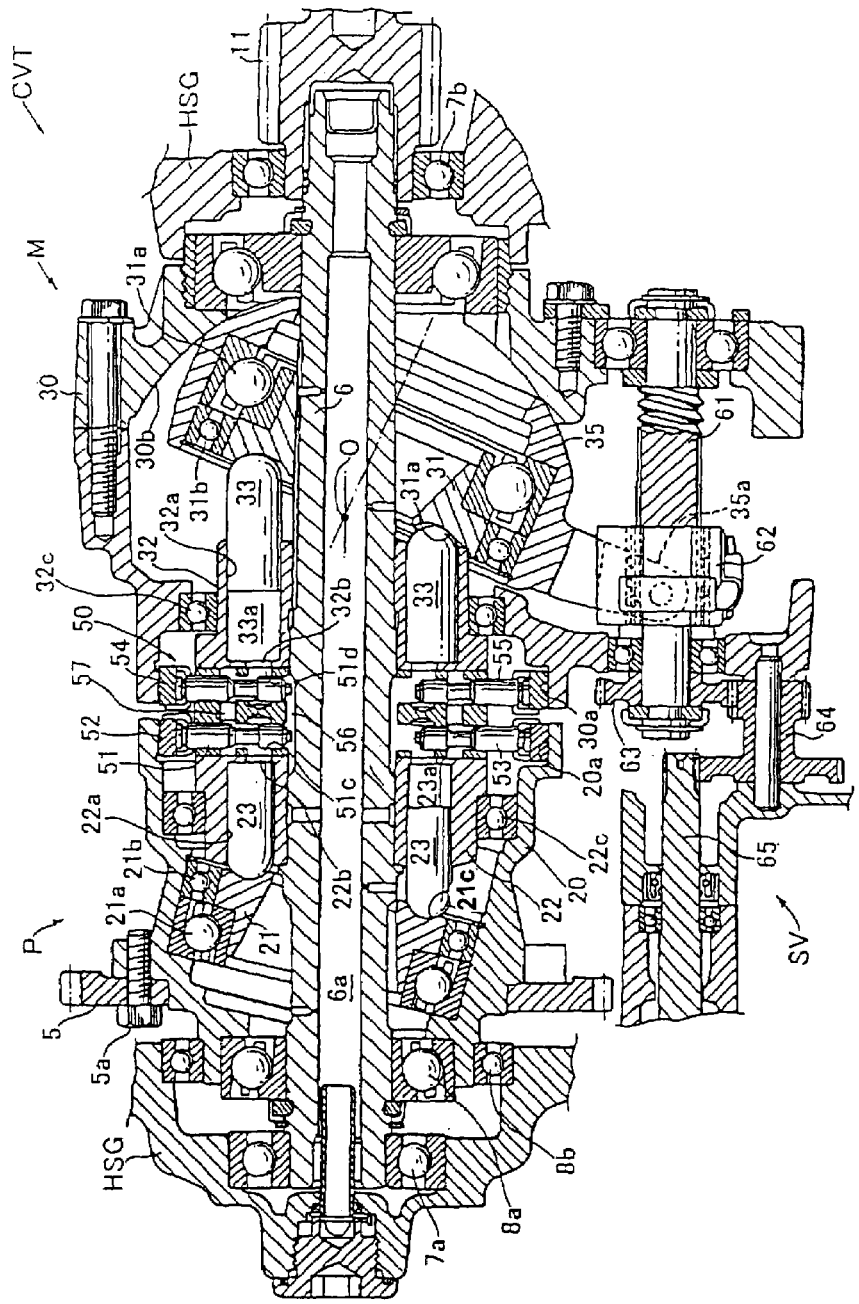
FIG. 1 is a sectional view of a hydraulic continuously variable transmission which includes a variable speed gear according to the present invention.

The hydraulic motor H includes a motor casing 30 coupled to and securely held by the transmission housing HSG with a motor rocking member 35 supported in sliding contact with a supporting spherical surface 30b formed on the inner surface of the motor casing 30 for sliding movement around a rocking motion center O extending in a direction, direction perpendicular to the plane of FIG. 1 perpendicular to the center axis of the transmission output power shaft 6. The hydraulic motor H further includes a motor swash plate member 31 supported and disposed for rotation in the motor rocking member 35 through bearings 31a and 31b with a motor cylinder 32 being provided in an opposing relationship to the motor swash plate member 31. A plurality of motor plungers 33 are individually disposed for sliding movement in a plurality of motor plunger holes 32a formed in the motor cylinder 32 such that they are arranged in an annular arrangement around the center axis of the motor cylinder 32 and extend in the axial direction through the motor cylinder 32. It is to be noted that the motor cylinder 32 is supported at an outer peripheral portion thereof for rotation by the motor casing 30 through a bearing 32c.

An outer side end portion of each of the motor plungers 33 projects outwardly and is contacted and engaged with a swash plate surface 31a of the motor swash plate member 31 while an inner side end portion of each motor plunger 33 is positioned in a motor plunger hole 32a and is opposed to the valve body 51 to form a motor oil chamber 33a in the motor plunger hole 32a. It is to be noted that a motor opening 32b which acts as a motor discharge port and intake port is formed at an end portion of the motor plunger hole 32a. An end portion of the motor rocking member 35 projects in a diametrically outward direction to form an arm portion 35a. The arm portion 35a projects outwardly in a diametrical direction and is connected to a motor servo mechanism SV. Thus, control of leftward and rightward moving of the arm portion 35a by the motor servo mechanism SV is performed and control of rocking the motor rocking member 35 around the rocking motion center O is performed. Where the motor rocking member 35 is rocked in this manner, also the motor swash plate member 31 supported for rotation in the inside of the motor rocking member 35 is rocked together to vary the swash plate angle of the motor swash plate member 31.

The distribution valve 50 is disposed between the pump cylinder 22 and the motor cylinder 32. The valve body 51 of the distribution valve 50 is held between and integrally coupled to the pump cylinder 22 and the motor cylinder 32 and is coupled to the transmission output power shaft 6. Consequently, the pump cylinder 22, the distribution valve 50, the motor cylinder 32 and the transmission output power shaft 6 rotate integrally with each other.

Figure 7:
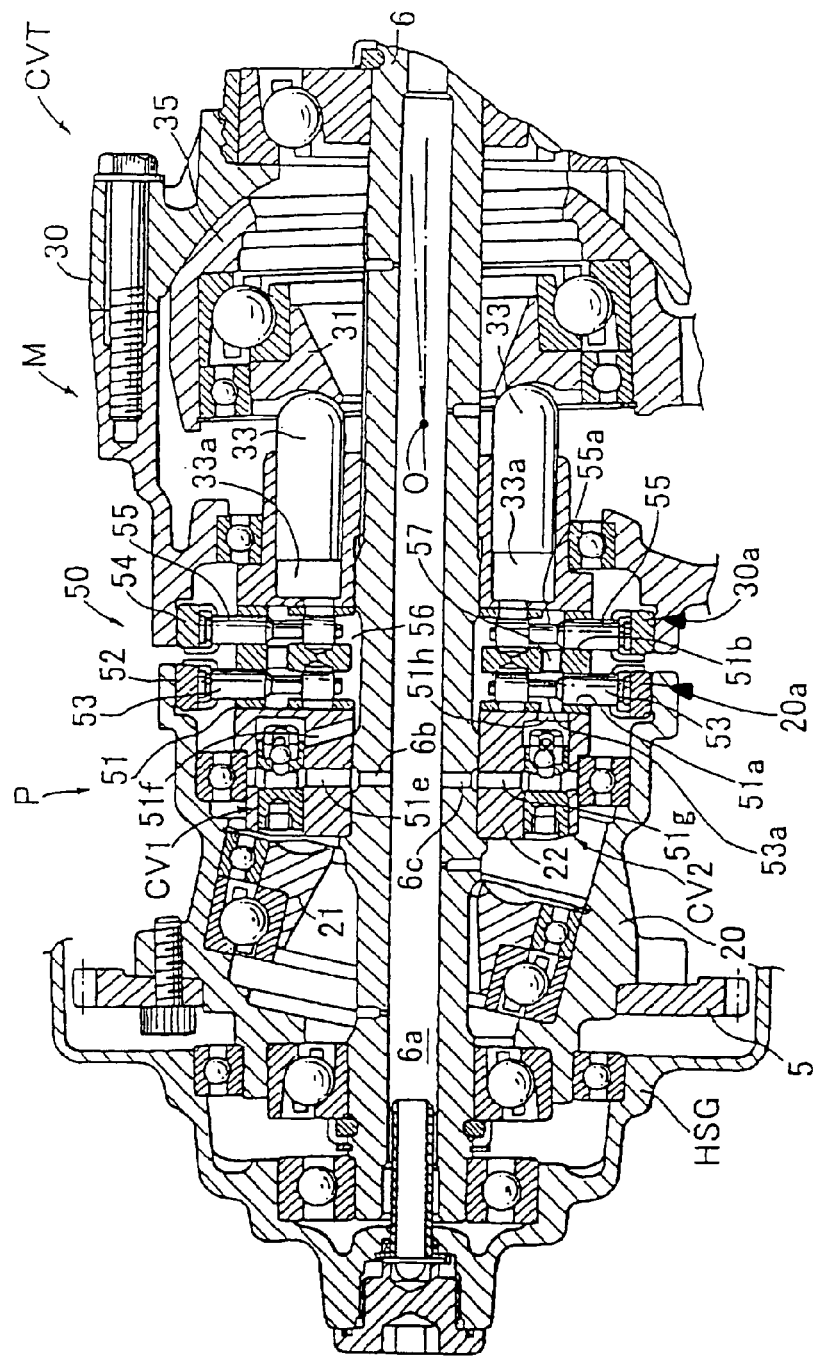
FIG. 7 is a sectional view of the hydraulic continuously variable transmission.

As particularly seen in FIG. 7, a plurality of pump side spool holes 51a and a plurality of motor side spool holes 51b are formed in a juxtaposed relationship in two rows in the valve body 51 which forms the distribution valve 50 such that they extend in diametrical directions and are spaced from each other by an equal distance in a circumferential direction. A pump side spool 53 is disposed for sliding movement in each of the pump side spool holes 51a while a motor side spool 55 is disposed for sliding movement in each of the motor side spool holes 51b.

The pump side spool holes 51a are formed in a corresponding relationship to the pump plunger holes 22a, and a plurality of pump side communicating paths 51c are formed in the valve body 51 such that the corresponding pump openings 22b, pump oil chambers 23a and the pump side spool holes 51a are communicated with each other therethrough. The motor side spool holes 51b are formed in a corresponding relationship to the motor plunger holes 32a, and a plurality of motor side communicating paths 51d are formed in the valve body 51 such that the corresponding motor openings 32b, motor oil chambers 33a and motor side spool holes 51b are communicated with each other therethrough. See FIG. 1.

Further, in the distribution valve 50, a pump side cam ring 52 is disposed at a position at which it surrounds an end portion of an outer periphery of the pump side spool 53 while a motor side cam ring 54 is disposed at another position at which it surrounds an end portion of an outer periphery of the motor side spool 55. The pump side cam ring 52 is attached in an eccentric inner circumferential surface 20a formed on an inner surface of an end of the pump casing 20 eccentrically from the center axis of rotation of the pump casing 20 and is rotated integrally with the pump casing 20. The motor side cam ring 54 is attached in an eccentric inner circumferential surface 30a formed on an inner surface of an end of the motor casing 30 eccentrically from the center axis of rotation of the motor cylinder 32. It is to be noted that an outer circumferential end of the pump side spool 53 is engaged for relative rotation with an inner circumferential surface of the pump side cam ring 52. In addition, an outer circumferential end of the motor side spool 55 is engaged for relative rotation with an inner circumferential surface of the motor side cam ring 54.

An inner side path 56 is formed between the inner circumferential surface of the valve body 51 and the outer circumferential surface of the transmission output power shaft 6 with the inner circumferential end portions of the pump side spool holes 51a and the motor side spool holes 51b being in communication with the inner side path 56. Further, an outer side path 57 is formed in the valve body 51 and permits communication between the pump side spool holes 51a and the motor side spool holes 51b.

The operation of the distribution valve 50 having the configuration described above is hereinafter described. When driving power of the engine E is transmitted to the input driven gear 5 to drive the pump casing 20 to rotate, the pump swash plate member 21 is rocked in response to the rotation. Consequently, the pump plungers 23 held in contacting engagement with the swash plate surface 21c of the pump swash plate member 21 are moved back and forth in the axial direction in the pump plunger holes 22a by the rocking motion of the pump swash plate member 21. Upon the inward movement of the pump plungers 23, operating oil is discharged from the pump oil chambers 23a through the pump openings 22b, and then upon the outward movement of the pump plungers 23, operating oil is sucked into the pump oil chambers 23a through the pump openings 22b.

At this time, the pump side cam ring 52 attached to an end portion of the pump casing 20 is rotated together with the pump casing 20. However, since the pump side cam ring 52 is attached eccentrically from the center of rotation of the pump casing 20, the pump side spools 53 are moved back and forth in a diametrical direction in the pump side spool holes 51a in response to the rotation of the pump side cam ring 52. While the pump side spools 53 are moved back and forth in this manner, when they are moved to the diametrically inner side as shown on the upper half side of FIG. 1, the pump side communicating paths 51c and the outer side path 57 are communicated with each other through a spool groove 53a, but when the pump side spools 53 are moved to the diametrically outer side as shown in the lower half side of FIG. 1, the pump side communicating paths 51c and the inner side path 56 are communicated with each other through the spool groove 53a.

Here, the eccentric mounting portion of the pump side cam ring 52 is set in the following manner. In particular, while the swash plate member 21 is rocked in response to the rotation of the pump casing 20 to move the pump plungers 23 back and forth, Within one half rotation of the pump casing 20 wherein the pump plungers 23 are moved from a position, hereinafter referred to as bottom dead center, at which the pump plungers 23 are pushed out most to the outer side to another position, hereinafter referred to as top dead center, at which the pump plungers 23 are pushed in most to the inner side, the pump side cam ring 52 moves the pump side spools 53 to the diametrically inner side. On the other hand, within the other half rotation of the pump casing 20 wherein the pump plungers 23 are moved from the top dead center to the bottom dead center, the pump side cam ring 52 moves the pump side spools 53 to the diametrically outer side.

As a result, when the pump plungers 23 are moved from the bottom dead center to the top dead center in response to the rotation of the pump casing 20 to discharge the operating oil in the pump oil chambers 23a from the pump openings 22b, the operating oil is sent out into the outer side path 57 through the pump side communicating paths 51c. On the other hand, when the pump plungers 23 are moved from the top dead center to the bottom dead center in response to the rotation of the pump casing 20, the operating oil in the inner side path 56 is sucked into the pump oil chambers 23a through the pump side communicating paths 51c and the pump openings 22b. From the above movements, as the pump casing 20 is driven to rotate, the operating oil discharged from the hydraulic pump P is supplied into the outer side path 57 while the operating oil is sucked into the hydraulic pump P from the inner side path 56.

On the other hand, since also the motor side cam ring 54 attached to an end portion of the motor casing 30 is mounted eccentrically from the center of rotation of the motor casing 30, when the motor cylinder 32 is rotated, the motor side spools 55 are moved back and forth in a diametrical direction in the motor side spool holes 51b in response to the rotation of the motor cylinder 32. While the motor side spools 55 are moved back and for in this manner, when the motor side spools 55 are moved to the inner diameter side as shown on the upper half side of FIG. 1, the motor side paths 51d and the outer side path 57 are in communication with each other through the spool groove 55a. However, when the motor side spools 55 are moved to the diametrically outer side as shown on the lower half side of FIG. 1, the motor side paths 51d and the inner side path 56 are in communication with each other through the spool groove 55a.

Here, as described above, the operating oil discharged from the hydraulic pump P is sent to the outer side path 57, and this operating oil is supplied from the motor side paths 51d through the motor openings 32b into the motor oil chambers 33a to press the motor plungers 33 in the outward axial direction. The outer side end portions of the motor plungers 33 upon which the outward pressing force in the axial direction acts in this manner slidably contacts with portions from the top dead center to the bottom dead center of the motor swash plate member 31 in a state wherein the motor rocking member 35 is rocked as shown in FIG. 1. The motor cylinder 32 is driven to rotate so that, by the outward pressing force in the axial direction, the motor plungers 33 are moved from the top dead center to the bottom dead center along the motor swash plate member 31.

In order to cause such rotational driving as just described to be performed, the eccentric mounting position of the motor side cam ring 54 is set in the following manner. In particular, while the motor plungers 33 are moved back and forth along the slope of the motor swash plate member 31, within one half rotation of the motor cylinder 32 wherein the motor plungers 33 are moved from the position, bottom dead center, pushed out most to the outer side to the position, top dead center, pushed in most to the inner side, the motor side cam ring 54 moves the motor side spools 55 to the diametrically outer side. On the other hand, within the other half rotation of the motor cylinder 32 wherein the motor plungers 33 are moved from the top dead center to the bottom dead center, the motor side cam ring 54 moves the motor side spools 55 to the diametrically outer side.

While the motor cylinder 32 is driven to rotate in this manner, when the motor plungers 33 move from the bottom dead center to the top dead center along the motor swash plate member 31 in response to the rotation of the motor cylinder 32, they are pushed to move inwardly, whereupon the operating oil in the motor oil chambers 33a is sent from the motor openings 32b to the inner side path 56 through the motor side paths 51d. The operating oil sent to the inner side path 56 in this manner is sucked into the pump oil chambers 23a through the pump side communicating paths 51c and the pump openings 22b as described hereinabove.

As can be seen from the foregoing description, when the pump casing 20 is driven to rotate by the rotational driving power of the engine E, operating oil is discharged from the hydraulic pump P to the outer side path 57 and is sent to the hydraulic motor H to drive the motor cylinder 32 to rotate. The operating oil having driven the motor cylinder 32 is sent to the inner side path 56 and sucked into the hydraulic pump P from the inner side path 56. The hydraulic closed circuit interconnecting the hydraulic pump P and the hydraulic motor H is formed from the distribution valve 50 in this manner, and the operating oil discharged from the hydraulic pump P in response to rotation of the hydraulic pump P is sent through the hydraulic closed circuit to the hydraulic motor H to drive the hydraulic motor H to rotate. Further, the operating oil discharged from the hydraulic motor H after having driven the hydraulic motor H is returned to the hydraulic pump P through the hydraulic closed circuit.

At this time, the pump cylinder 22 and the motor cylinder 32 are coupled to and integrally rotate with the transmission output power shaft 6, and when the motor cylinder 32 is driven to rotate as described above, also the pump cylinder 22 rotates together and the speed of relative rotation between the pump casing 20 and the pump cylinder 22 decreases. Thus, the relationship between the rotational speed Ni of the pump casing 20 and the rotational speed No of the transmission output power shaft 6, that is, the speed of rotation of the pump cylinder 22 and the motor cylinder 32, is represented by the following expression (1) with regard to the pump capacity Vp and the motor capacity Vm.

Expression 1

$$Vp \cdot (Ni - No) = Vm \cdot No \qquad (1)$$

The motor capacity Vm can be continuously varied by control which causes the motor servo mechanism SV to rock the motor rocking member 35. Consequently, where the speed Ni of rotation of the pump swash plate member 21 is fixed in the expression (1) above, if control of the continuous varying of the motor capacity Vm is performed, then variable speed control wherein the speed of the rotation of the transmission output power shaft 6 is continuously varied is performed.

If control of reducing the angle of the rocking motion of the motor rocking member 35 is performed, then the motor capacity Vm decreases, and where the pump capacity Vp is fixed and the speed Ni of rotation of the pump swash plate member 21 is fixed in the relationship of the expression (1) above, the control becomes control wherein the speed of rotation of the transmission output power shaft 6 is increased so as to approach the speed Ni of rotation of the pump swash plate member 21, that is, non-stage variable speed control to the top gear position. Then, when the angle of the motor swash plate becomes equal to zero, that is, when the motor swash plate comes to a vertically upstanding state, theoretically the transmission gear ratio, top gear ratio, of Ni=No is reached and a hydraulically locked state is established. Consequently, the pump casing 20 rotates integrally with the pump cylinder 22, motor cylinder 32 and transmission output power shaft 6 to perform a mechanical power transmission.

The control of continuously varying the motor capacity as described above is performed by rocking the motor rocking member 35 to variably control the angle of the motor swash plate. The motor servo mechanism SV for rocking the motor rocking member 35 in this manner is described below with reference principally to FIG. 6.

The motor servo mechanism SV includes a ball screw shaft 61 supported for rotation on the transmission housing HSG by bearings 60a and 60b and positioned in the proximity of the arm portion 35a of the motor rocking member 35 in such a manner as to extend in parallel to the transmission output power shaft 6 with a ball nut 62 being disposed in a screwed engagement with a male screw 61a formed on an outer periphery of the ball screw shaft 61. It is to be noted that a ball female screw 62a is formed on an inner periphery of the ball nut 62 from a large number of balls held in a juxtaposed relationship like a screw by a cage, and the ball female screw 62a is screwed with the male screw 61a. The ball nut 62 is connected to the arm portion 35a of the motor rocking member 35 such that, when the ball screw shaft 61 is driven to rotate, the ball nut 62 is moved leftward and rightward on the ball screw shaft 61 to rock the motor rocking member 35.

In order to drive the ball screw shaft 61 to rotate in this manner, a swash plate control motor, electric motor, 67 is attached to an outer side surface of the transmission housing HSG A driving shaft 67a of the swash plate control motor 67 is connected to a spacer shaft 65 through a coupling 66. The spacer shaft 65 is supported for rotation on the transmission housing HSG such that it extends in parallel to the transmission output power shaft 6 within the transmission housing HSG and further extends to a position near to an end portion of the ball screw shaft 61 farther than the outer periphery of the input driven gear 5. Meanwhile, an idle shaft 64c is disposed and supported on the transmission housing HSG such that it extends in parallel to the spacer shaft 65, and an idle gear member 64 is mounted for rotation on the idle shaft 64c.

A first gear 65a is formed at an end of the spacer shaft 65 and held in meshing engagement with a second gear 64b provided integrally on the idle gear member 64. Further, a third gear 64a is provided integrally on the idle gear member 64 and held in meshing engagement with a fourth gear 63 coupled to and mounted at an end portion of the ball screw shaft 61. Therefore, when the rotational driving control of the swash plate control motor 67 is performed to rotate the driving shaft 67a, the rotation is transmitted to the fourth gear 63 through the idle gear member 64 to drive the ball screw shaft 61 to rotate, whereupon the ball nut 62 is moved leftward and rightward on the ball screw shaft 61 to perform control to rock the motor rocking member 35. Since rotation of the swash plate control motor 67 is transmitted to the ball screw shaft 61 through the idle gear train in this manner, the transmission ratio can be varied and set freely by suitably setting the gear ratio of the idle gear train.

In addition, when oil flows in the hydraulic closed circuit to perform transmission of hydraulic power between the hydraulic pump P and the hydraulic motor H as described above, leakage of the oil from the hydraulic closed circuit and leakage of the oil from the fitting portions between the pump and motor plunger holes 22a and 32a and between the pump and motor plungers 23 and 33 occurs. Therefore, a charge oil supply hole 6a is formed in the transmission output power shaft 6 such that it extends in the axial direction and is connected to a first check valve CV1 disposed in the pump cylinder 22 through an oil path 6b formed in the transmission output power shaft 6 and another oil path 51e formed in the pump cylinder 22 as shown in FIG. 7 and is further connected from the first check valve CV1 to the inner side path 56 through an oil path 51f. Therefore, charge oil supplied from a charge oil supply source not shown to the charge oil supply hole 6a is supplied to the inner side path 56 through the first check valve CV1 as occasion demands.

It is to be noted that the charge oil supply hole 6a is connected to a second check valve CV2 disposed in the pump cylinder 22 through an oil path 6c formed in the transmission output power shaft 6 and another oil path 51g formed in the pump cylinder 22 and is further connected from the second check valve CV2 to the outer side path 57 through an oil path 51h. Consequently, charge oil supplied to the charge oil supply hole 6a is supplied to the outer side path 57 through the second check valve CV2 as occasion demands.

As can be recognized from the description of operation of the hydraulic pump P and the hydraulic motor H above, in an ordinary traveling state, that is, in a state wherein the hydraulic motor H is driven to rotate by operating oil supplied from the hydraulic pump P, since the inside of the outer side path 57 is in a high pressure state and the inside of the inner side path 56 is in a low pressure state, charge oil is supplied into the inner side path 56 through the first check valve CV1. However, in another state wherein an engine brake action is performed during traveling, since the inside of the outer side path 57 is in a low pressure state and the inside of the inner side path 56 is in a high pressure state, charge oil is supplied into the outer side path 57 through the second check valve CV2.

Figure 8:
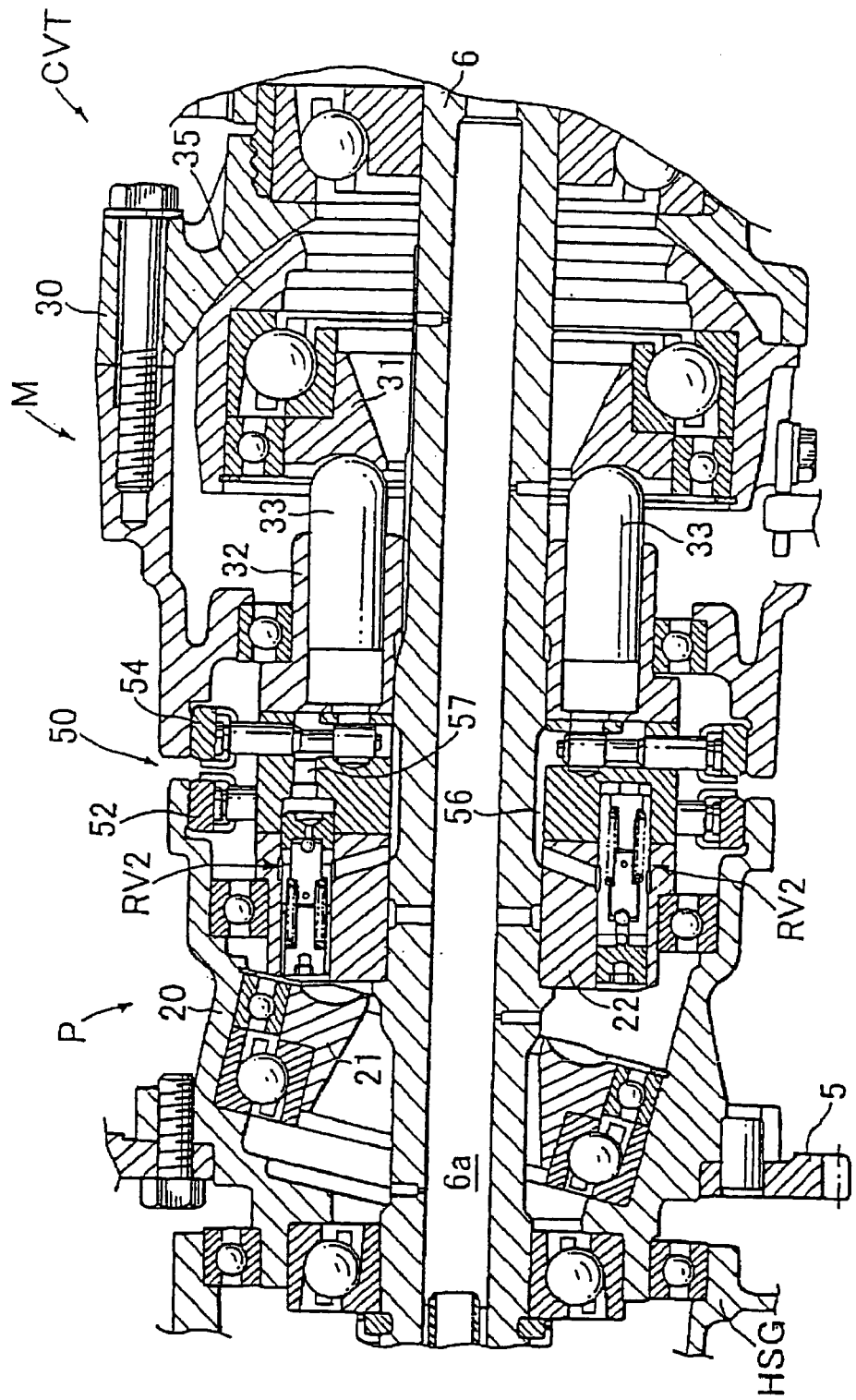
FIG. 8 is a sectional view of the hydraulic continuously variable transmission.

As seen in FIG. 8, first and second relief valves RV1 and RV2 are also disposed in the pump cylinder 22. The first relief valve RV1 is disposed to connect the outer side path 57 and the inner side path 56 to each other such that, if the hydraulic pressure in the outer side path 57 exceeds a predetermined pressure, then it is opened to release the hydraulic pressure to the inner side path 56 thereby to prevent the hydraulic pressure in the outer side path 57 from becoming excessively high. The second relief valve RV2 is disposed to connect the inner side path 56 and the outer side path 57 to each other such that, if the hydraulic pressure in the inner side path 56 exceeds a predetermined pressure, then it is opened to release the hydraulic pressure to the outer side path 57 thereby to prevent the hydraulic pressure in the inner side path 56 from becoming excessively high.

As described above, according to the present invention, a shift position detection apparatus for a variable speed gear includes a plurality of shift detection portions provided on a shift shaft or a shift fork in a corresponding relationship to a plurality of shift positions. A plurality of position sensors are individually disposed in an opposing relationship to the shift detection portions. The apparatus is configured such that the movement of the shift detection portions in an axial direction by a movement of the shift shaft in the axial direction is detected by the position sensors to detect the shift position. In addition, at least two of the plural shift detection portions are disposed at different positions on substantially the same plane perpendicular to the axis of the shift shaft. Therefore, at least two shift detection portions and the position sensors opposing to them are disposed at positions on substantially the same plane perpendicular to the axis, that is, at the same position in the axial direction. Consequently, the dimension of the variable speed gear in the axial direction is not increased and can be miniaturized and made more compact.

It is to be noted that the shift position detection apparatus may be configured such that the shift fork includes a cylindrical portion and a fork portion extending in a projecting manner in a diametrically outer direction and engaged with the clutch member and that at least two shift detection portions are formed from concave portions or convex portions formed at different positions on the outer circumferential surface of the cylindrical portion on the substantially same plane perpendicular to the axis of the shift shaft. At least two shift detection portions may be formed from concave portions or convex portions formed at different positions on an outer circumferential surface of the shift shaft on the substantially same plane perpendicular to the axis of the shift shaft. Where such configurations as just described are employed, the length of the shift shaft can be suppressed thereby to make the variable speed gear miniaturized and more compact. Particularly where at least two shift detection portions are provided on the outer periphery of the cylindrical portion of the shift fork, the number of shift detection portions to be provided on the shift shaft can be reduced to reduce the length of the shift shaft. Consequently, the variable speed gear can be further miniaturized and made compact.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift position detection apparatus for a variable speed gear, comprising:
   a clutch member disposed for movement in an axial direction on a power transmission shaft;
   a shift shaft disposed so as to extend in parallel to said power transmission shaft;
   a shift fork coupled and attached to said shift shaft and having an end engaged with said clutch member, said shift fork being configured wherein in response to a shift operation, said shift shaft and said shift fork are moved in the axial direction to move said clutch member in the axial direction on said power transmission shaft to select a shift position;
   a plurality of shift detection portions provided on said shift shaft or said shift fork in a corresponding relationship to a plurality of shift positions; and
   a plurality of position sensors individually disposed in an opposing relationship to said shift detection portions, wherein the movement of said shift detection portions in the axial direction by the movement of said shift shaft in the axial direction is detected by said position sensors to detect the shift position; and
   at least two of said plurality of shift detection portions are disposed at different positions in a same lateral position in the axial direction and are spaced radially relative to each other.

2. The shift position detection apparatus according to claim 1, wherein:
   said shift fork includes a cylindrical portion fitted on and attached to said shift shaft and a fork portion extending in a projecting manner in a diametrically outer direction from an outer circumferential surface of said cylindrical portion and engaged with said clutch member, and wherein
   at least two of the plurality of shift detection portions are formed from concave portions or convex portions formed at different positions on the outer circumferential surface of said cylindrical portion on the substantially same plane perpendicular to the axis of said shift shaft.

3. The shift position detection apparatus according to claim 1, wherein at least two of the plurality of shift detection portions are formed from concave portions or convex portions formed at different positions on an outer circumferential surface of said shift shaft on the substantially same plane perpendicular to the axis of said shift shaft.

4. The shift position detection apparatus according to claim 1, and further including a pivotal arm mounted for pivotal motion around a rotary shaft, said pivotal arm being movable in an axial direction for selectively imparting movement to the shift shaft.

5. The shift position detection apparatus according to claim 1, wherein a dimension of the length of the shift shaft of the shift position detection apparatus can be made compact by positioning the at least two of said plurality of shift detection portions on substantially the same plane perpendicular to the axis of the shift shaft.

6. The shift position detection apparatus according to claim 1, and further including a detent mechanism for selectively engaging a detent member and a biasing force for positioning the detent mechanism along the shift shaft in one of three axially moved positions.

7. The shift position detection apparatus according to claim 1, wherein the at least two of said plurality of shift detection portions are spaced at approximately 60 degrees in a circumferential direction.

8. The shift position detection apparatus according to claim 1, and further including a counter shaft disposed substantially in parallel with the power transmission shaft, a forward gear and a reverse gear being operatively connected to said counter shaft for selective engagement by the clutch member.

9. The shift position detection apparatus according to claim 8, wherein said forward gear and the reverse gear include internal teeth for selective engagement with corresponding external teeth on said clutch member.

10. A shift position detection apparatus for a variable speed gear, comprising:
    a clutch member disposed for movement in an axial direction on a power transmission shaft;

a shift shaft extending substantially in parallel to said power transmission shaft;

a shift fork operatively coupled and attached to said shift shaft and having a first end engaged with said clutch member, in response to a shift operation, said shift shaft and said shift fork are moved in an axial direction to selectively move said clutch member in the axial direction on said power transmission shaft to select a shift position;

a plurality of shift detection portions provided on said shift shaft or said shift fork in a corresponding relationship to a plurality of shift positions; and a plurality of position sensors individually disposed in an opposing relationship to one of said plurality of shift detection portions, wherein the movement of said plurality of shift detection portions in the axial direction by the movement of said shift shaft in the axial direction is detected by said plurality of position sensors to detect the shift position; and at least two of said plurality of shift detection portions are disposed in the same lateral position in the axial direction and are spaced radially relative to each other.

11. The shift position detection apparatus according to claim 10, and further including a pivotal arm mounted for pivotal motion around a rotary shaft, said pivotal arm being movable in an axial direction for selectively imparting movement to the shift shaft.

12. The shift position detection apparatus according to claim 10, wherein:

said shift fork includes a cylindrical portion fitted on and attached to said shift shaft and a fork portion extending in a projecting manner in a diametrically outer direction from an outer circumferential surface of said cylindrical portion and engaged with said clutch member, and wherein at least two of said plurality of shift detection portions are formed from concave portions or convex portions formed at different positions on the outer circumferential surface of said cylindrical portion on the substantially same plane perpendicular to the axis of said shift shaft.

13. The shift position detection apparatus according to claim 10, wherein at least two of said plurality of shift detection portions are formed from concave portions or convex portions formed at different positions on an outer circumferential surface of said shift shaft on the substantially same plane perpendicular to the axis of said shift shaft.

14. The shift position detection apparatus according to claim 10, wherein a dimension of the length of the shift shaft of the shift position detection apparatus can be made compact by positioning the at least two of said plurality of shift detection portions on substantially the same plane perpendicular to the axis of the shift shaft.

15. The shift position detection apparatus according to claim 10, and further including a detent mechanism for selectively engaging a detent member and a biasing force for positioning the detent mechanism along the shift shaft in one of three axially moved positions.

16. The shift position detection apparatus according to claim 10, wherein the at least two of said plurality of shift detection portions are spaced at approximately 60 degrees in a circumferential direction.

17. The shift position detection apparatus according to claim 10, and further including a counter shaft disposed substantially in parallel with the power transmission shaft, a forward gear and a reverse gear being operatively connected to said counter shaft for selective engagement by the clutch member.

18. The shift position detection apparatus according to claim 17, wherein said forward gear and the reverse gear include internal teeth for selective engagement with corresponding external teeth on said clutch member.

* * * * *